July 10, 1928.
H. L. GLIDDEN
CUTTING MACHINE
Filed July 10, 1922
1,676,260
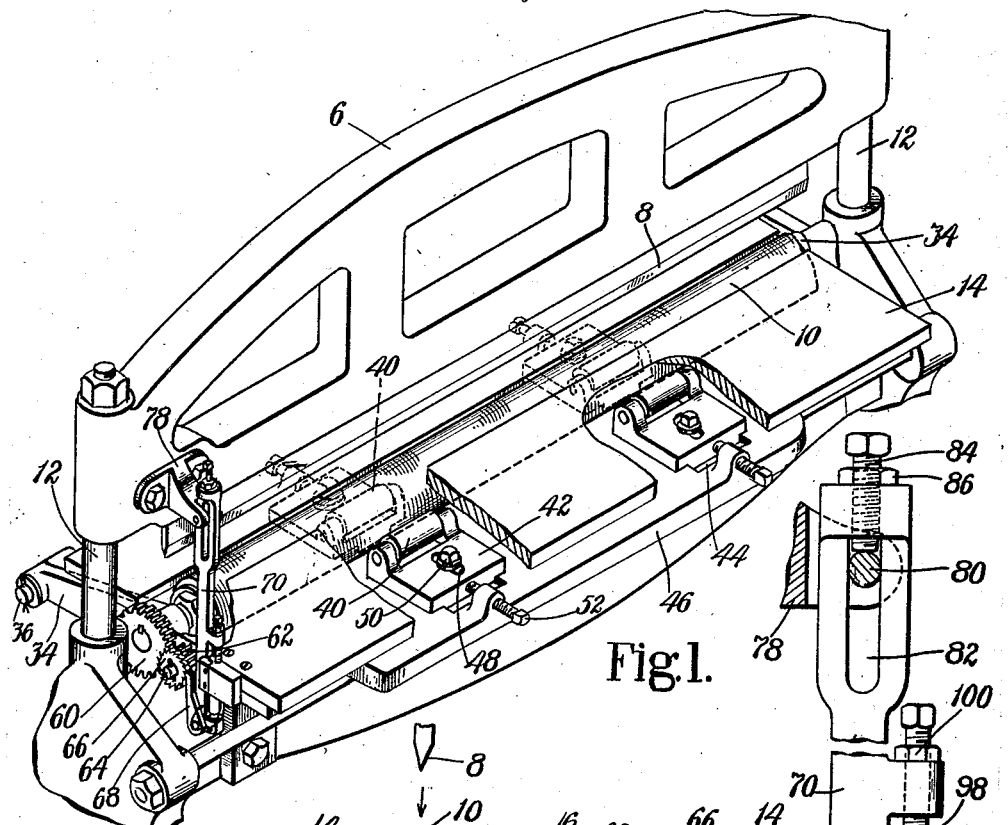
Fig. 1.
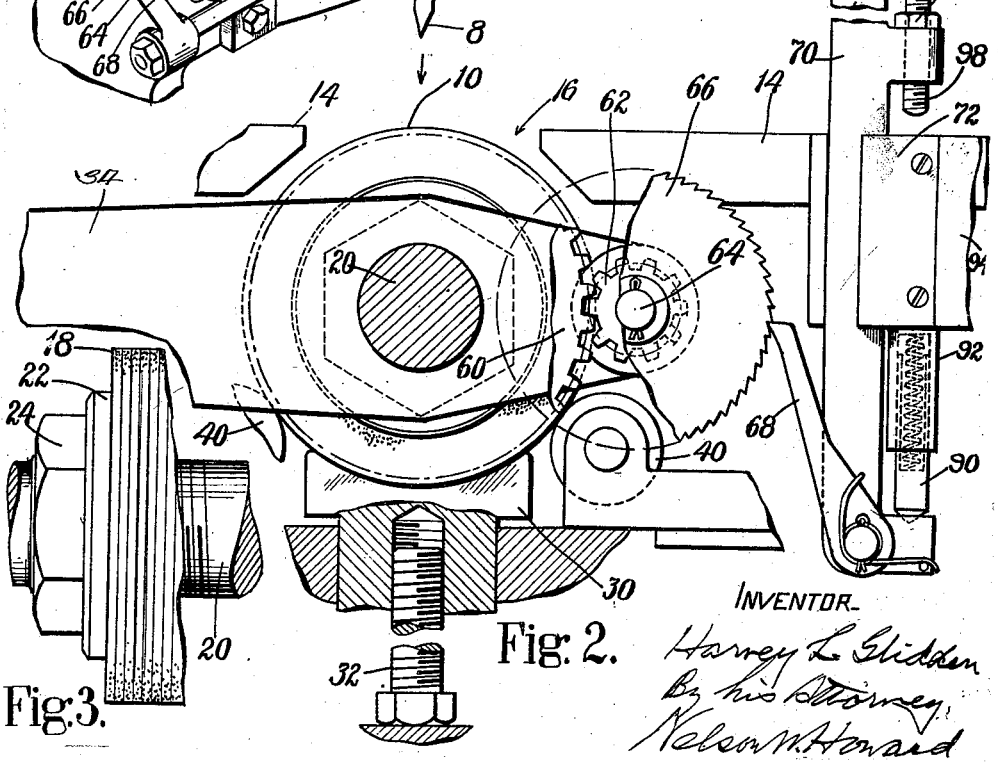
Fig. 2.
Fig. 3.
INVENTOR
Harvey L. Glidden
By his Attorney,
Nelson W. Howard Patented July 10, 1928.

1,676,260

UNITED STATES PATENT OFFICE.

HARVEY L. GLIDDEN, OF NEEDHAM HEIGHTS, MASSACHUSETTS, ASSIGNOR TO UNITED SHOE MACHINERY CORPORATION, OF PATERSON, NEW JERSEY, A CORPORATION OF NEW JERSEY.

CUTTING MACHINE.

Application filed July 10, 1922. Serial No. 573,775.

This invention relates to cutting machines and more particularly to machines for cutting sheet material into strips.

The invention is illustratively shown embodied in a stripping machine of the type set forth in United States Letters Patent No. 1,161,038, granted Nov. 23, 1915, on application of H. H. Eaton, designed for cutting leather, leather-board and the like, although various features of the invention are not limited to the embodiment in a machine of this type or to use in cutting such material.

As heretofore constructed, machines of the type referred to have required considerable attention on the part of the operator and frequent adjustments to keep the machine up to even a moderate standard of efficiency in cutting operations over any extended period of time. The difficulty in securing clean cutting of the material with these machines resides largely in the construction and arrangement of the cutting block which co-operates with the cutter and receives the thrust of the cutting edge of the cutter in each cutting operation. Commonly, a wooden block has been used to support the stock and to receive the cutting edge of the knife. After a relatively few operations the groove made by the cutting edge of the knife is so widened and deepened that clean cutting of the material becomes impossible, since the material is forced down into the groove and ragged edges are produced instead of the clean cut edge which is so eminently desirable. Hence, relatively frequent and time-consuming adjustments of the cutting block are necessary, the alternative being the production of unsatisfactory and even unsaleable material as a result of the cutting operations.

It is an object of this invention to provide a cutting block which will be especially simple in construction, efficient in operation and free from the deficiencies and defects which have characterized prior constructions.

To this end, considered in one aspect, the invention provides a cylindrical cutting block of felted fiber material, the fibers of which bend under the wedging action of the knife without breaking, thus providing an especially efficient cutting surface. Preferably the block is composed of disks with the "grains" of the disks pointing in different directions. Since the disks are relatively thin and are pressed tightly together, the edge of each disk receives support from those adjacent to it and thus a relatively softer part of one disk receives protection from a relatively firmer "grain" part of an adjacent disk. The construction and arrangement of the disks are such that a smooth surface for cutting operations is maintained for a remarkably long period of time.

Further to facilitate clean cutting and to prolong the useful life of the cutting block, the invention also provides improved means for moving a cutting block such as a cylindrical block relatively to the knife after each cutting operation to position a new cutting surface for co-operation with the knife.

In the illustrative construction this means comprises mechanism for rotating a cylindrical cutting block step-by-step in one direction, the illustrative mechanism being so constructed as to effect rotative movements of the block between cutting operations in such manner as to ensure that cutting operations will be performed over all of the cylindrical surface a plurality of times before the block is again positioned for a repetition of cutting operations which utilize exactly the same portions of the block which have previously served in co-operation with the knife to cut the material.

Other features of construction and novel combinations of parts will be described in the specification and pointed out in the appended claims.

In the drawings:—

Fig. 1 is a perspective view, partly in section, showing an illustrative embodiment of the invention.

Fig. 2 is a detail view of the mechanism for rotating the cylindrical cutting block; and Fig. 3 is a detail showing the disks which compose the cylinder mounted on a shaft which also carries a gear of the cylinder rotating mechanism.

In the illustrative machine there is provided a cross head 6 carrying the knife 8 and reciprocable toward and from the cutting block 10 by means of rods 12 which carry the crosshead and which are reciprocated through connections with a power shaft, not shown. For supporting the work there is provided a table 14 having a slot or recess 16 extending transversely thereof directly below and in alignment with the knife 8. The construction and operation of these parts of the illustrative machine are as set forth in the Letters Patent before referred to and reference may be had to said Letters Patent for more detailed disclosure of the construction and operation of parts not fully described herein.

Mounted in this recess is the cutting block 10 which, in the illustrative construction is a cylindrical block of felted fiber material consisting of wood pulp, cotton rags, and a relatively small percentage of leather scrap finely divided. This material is reduced to a pulp and is made into sheets of felted material in a manner that is similar to the manufacture of cardboard and fiber board. A preponderance of the fibers are pointed in one direction so that the fiber board has a distinct grain and hence one edge of the board, the grain edge, is firmer than another edge. In making a block, the fiber board is first cut into disks 18 with perforations in the middle so that the said disks may be strung upon an iron rod which becomes the shaft 20. The disks are glued and subsequently pressed together with many tons pressure while on the rod and, after drying, the cylinder is turned to make a smooth cylindrical surface. In order to hold the disks firmly clamped upon the shaft there is provided at one end a washer 22 and a nut 24 which can be turned to clamp the disks as firmly as may be desired, it being preferable to tighten this nut occasionally to take up any shrinkage due to drying of the disks. This serves to keep a smooth firm surface on the cutting surface of the cylinder. While in the manufacture of the felted fiber board a preponderance of the fibers is pointed in one direction, which results in making the disk more resistant to the thrust of the knife at one part of its periphery than at another part, the fact that the disks are strung on the rod promiscuously so that their grains extend in different directions radially of the block and that they are furthermore relatively thin and pressed firmly together accounts for the fact that good results are attained, since in actual practice it is found that all parts of the surface of the cylinder stand up equally well under the thrust of the cutting edge of the knife. In other words although small portions of the periphery of the block along the line of contact with the knife may be relatively softer than other portions, it is backed up and supported by the disks on either side and this is especially true since all of the disks are under great pressure which is constantly maintained to keep them in proper supporting relation to each other. It is found that the surfaces of the fiber cutting block presents a co-operating surface for use with the cutter that is highly effective in cutting operations upon sheet material of all kinds. This is largely true because of the fact that the compressed material of the fiber block receives the edge of the cutter without too much yielding so that a firm surface is provided and a clean cut effected on the sheet material and, further, because the fibers bend under the wedging action of the cutting edge of the knife without breaking as the wood fibers are apt to do under the best conditions and the most careful treatment. It has been found that wooden blocks cannot withstand cutting action on the cylindrical surface of the block without splitting or chipping or wedging the piece from the periphery of the block. After one revolution of the cylinder and the beginning of a repetition of the parallel cuts of the second revolution, the surface of a wood cylinder would almost certainly be damaged to such an extent as to be useless as a cutting surface. Hence, the provision of a fiber block and particularly of one constructed in the manner described offers a solution which has marked advantages over anything known heretofore.

For supporting the cylinder there is provided a relatively heavy unyielding member 30 supported at its ends, and at an intermediate point if desired, upon screw threaded members 32 resting upon strong supporting parts, in the frame of the machine, the members 32 being adjustable to cause movement of the support 30 in a vertical direction so that as the cutting block 10 is reduced in diameter due to wear, it may be adjusted upwardly in the recess 16 so as to maintain its work supporting surface in the plane of the upper surface of the table 14. Conveniently, the ends of the shaft 20 are mounted in bearings provided by a pair of pivoted arms 34, one at each end of the shaft, adapted to turn about pivots 36 in the frame of the machine. As a means for preventing lateral yielding of the cutting block 18 under the thrust of the cutter 8, there is provided a plurality of rolls 40, two or more on each side of the cutting block 18, as indicated in Fig. 1 of the drawings. Each roll is mounted rotatably upon a plate 42 which is slidable in a recess 44 in a supporting table 46 which is below the table 14. As shown, each block 42 is provided with a slot 48 through which projects a bolt 50 by which the plate is bolted to the supporting table, a screw member 52 being provided for adjusting the block so that the roller 40 will press firmly against the side of the cylinder 10, it being understood that the bolt 50 is loosened while the screw member 52 is adjusting the block 42, and that subsequently the bolt 50 is tightened to hold the roll in place.

Means is preferably provided for rotating the cutting block 10 automatically so that a new cutting surface is provided for each cutting operation. Heretofore, means has been provided for enabling the operator to adjust a cylindrical cutting roll by hand. This is objectionable, however, for several reasons and more particularly since it requires attention on the part of the operator and takes time from his work. Moreover, the adjustment of the block is usually left until the cutting becomes so poor that adjustment can no longer be delayed. A prime advantage of the illustrative automatic adjustment results from the fact that the adjustment can be made so fine that the parallel cuts will be very closely adjacent each other, whereby any predetermined number of the infinite number of surfaces of the cylinder can be made to serve in turn as cutting surfaces in co-operation with the knife or cutter 8. Furthermore, when the cuts are thus placed so closely together there is room for a slight bending of the fibers due to the wedging action of the knife edge without such great compression of the fibers as would tend to break them. Moreover, upon continued rotation of the block through a plurality of complete revolutions, and a repetition of the cutting operations upon each succeeding revolution there results a compacting of the surface of the block that keeps it in excellent condition without any great amount of wear or loss of substance.

In the illustrative construction the shaft 20 is provided with a gear wheel 60 which is arranged to mesh with a small gear 62 on a counter shaft 64 mounted in a bearing carried by the pivoted member 34. On the outer end of the shaft 64 and secured fixedly thereto is a ratchet wheel 66 arranged to be driven by a pawl 68 carried at the lower end of a slide 70 reciprocable in a bearing 72 provided in the frame of the machine or carried by the table 14. While any suitable means may be used to reciprocate the slide 70 in properly timed relation to the cutting operations, that shown comprises connections to the beam 6 so arranged that the pawl is lifted to turn the ratchet wheel 66 at the end of the upward movement of the beam 6. As shown, this mechanism comprises a bracket 78 secured to the beam 6 at one end and having a cross pin 80 (Fig. 2) receivable in a slot 82 in the upper end of the slide 70. For adjusting the throw of the slide 70 its upper end is provided with a screw threaded opening for an adjustable abutment member 84 which may be locked in adjusted position by the lock nut 86 with its lower end projecting to engage the cross pin. For urging the slide 70 in the opposite direction, on downward movement of the cross head 6, there is provided a spring pressed plunger 90 seated in a socket member 92 extending downwardly in the lower end of the bracket 94 which may form a part of the bearing 72 for the slide 70. For limiting adjustably the downward movement of the slide 70 under the action of the spring pressed plunger 90 there is provided the stop 98 which consists of a screw threaded bolt which is adapted to be locked in place by the lock nut 100. Upon each reciprocation of the cross beam 6 the pawl 68 moves the ratchet wheel 66 a distance corresponding to each individual tooth on the ratchet wheel, this movement of the ratchet wheel being transmitted through the small gear 62 and large gear 60 to the shaft 20 of the cutting block 10. In the construction shown, the teeth on the gear 60 number four times the number of teeth on the gear 62, plus one, so that the total number of teeth on the gear 60 constitutes a prime number, thus assuring that the cylinder block 10 will make several revolutions before the cutter strikes twice in the same place on the cylindrical block. If now the ratchet 66 be provided with a plurality of teeth corresponding to a prime number, such as 51, it is assured that the cuts in the surface of the roll will be close together and evenly spaced throughout the whole periphery of the cylindrical block, and that repeated revolutions of the cylindrical block will take place before cutting the second time in the same place on the surface of the block. One result of this construction and mode of operation is found in a compacting of the surface of the block that contributes materially to its life. However, there is a slight loss of substance which in time reduces the diameter of the block and necessitates its adjustment with respect to the plane of the upper surface of the table 14. This adjustment is very infrequent as compared with the requirements in this particular, of prior constructions. The wearing away of the block takes place with great evenness and there is no need at any time of a resurfacing of the block so common and necessary with cutting blocks as heretofore constructed.

In operating with the machine it is necessary only that the operator shall place the material on the table 14 and present it in proper position beneath the knife 8. Each time the treadle is operated, in the illustrated form of stripping machine, the cutter descends and cuts a strip from the material, and upon elevation of the beam the cylindrical block is turned one step to present a new cutting surface as above described. It will be understood, of course, that the cylindrical block and its operating mechanism may be utilized in machines which run continuously to cut blanks from sheet material fed automatically to cutting position, and that various important features of the invention may have other applications and uses than those described in connection with the illustrative machine.

Having thus described my invention, what I claim as new and desire to secure by Letters Patent of the United States is:—

1. In a machine of the character described, means for cutting sheet material comprising a cutter, a cutting block for co-operation with the cutter, means for moving the block to present new cutting surfaces to the cutter, means for adjusting the cutting block and its moving means toward and from the cutter, and means for maintaining the block and its moving means in engagement in adjusted positions.

2. In a machine of the character described, a cutter, a crosshead carrying the cutter, a cylindrical block for co-operation with the cutter, and means controlled by the crosshead for intermittently rotating the block to present a new surface for co-operation with the cutter at each cutting operation during a plurality of revolutions of the block.

3. In a machine of the class described, a cutter, a cylindrical cutting block for co-operation with the cutter, means for intermittently rotating the block so as to present a new surface for each cutting operation, means for adjusting the block and its rotating means in a direction toward the cutter, and a member constructed and arranged to support the cutting block and its rotating means in engaging relation to each other in adjusted positions.

4. In a machine of the character described, a cutter, a cylindrical cutting block for co-operation with the cutter in cutting operations upon sheet material, and means for intermittently rotating the cylindrical block a plurality of times between repetitions of cutting operations on the same cutting surface of the block.

5. In a machine of the character described, a cutter, a cylindrical block for co-operation with the cutter, and means for rotating the cutter block during movement of the cutter to present a new surface at each cutting operation throughout a predetermined plurality of revolutions of the block.

6. In a machine of the character described, a cutter, a cylindrical cutting block for co-operation with the cutter, a gear secured to the cylindrical block having an odd number of teeth, a second gear for driving the first gear and having an even number of teeth, a ratchet wheel secured to rotate with the second gear, and a pawl operable upon each actuation of the cutter for rotating the ratchet wheel whereby the cylindrical block is turned to present a new cutting surface at each cutting operation throughout a predetermined number of revolutions of the block.

7. In a cutting machine, a cylindrical cutting block composed of disks of fiber composition having a distinct grain, the disks being arranged so that the grains thereof extend in different directions at right angles to the axis of the block, a shaft extending through the disks to support the same, and a cutter having an edge extending longitudinally of the block.

8. In a machine of the character described, a cutter, a table for supporting sheet material and having a slot extending transversely thereof, a cylindrical cutting block mounted to present a portion of its periphery through the slot and into the plane of the upper surface of the table, means for rotating the cylindrical block means for adjusting the cylinder in the slot, and means for mounting the cylindrical block rotating means for adjustment along with the cylinder.

9. In a machine of the character described, a cutter, a table for supporting sheet material and having a slot extending transversely thereof, a cylindrical cutting block mounted to present a portion of its periphery through the slot and into the plane of the upper surface of the table, and a plurality of rollers for engaging the cylindrical block to hold it in proper alinement in the slot.

10. In a machine of the character described, a cutter, a cylindrical cutting block, and means comprising gears for rotating the cylindrical block, after each actuation of the cutter, through a very small arc so that the lines of cut on the block are close together, one of the gears being connected directly to the block, and this gear and its driving gear having one an odd number of teeth and the other an even number of teeth so that the block is rotated throughout a predetermined number of revolutions before cutting operations are repeated upon exactly the same portions of the cylindrical surface of the block.

11. In a machine of the character described, a cutter, a cylindrical cutting block composed of disks of felted fiber material having a distinct grain, a shaft passing centrally through the disks to support the same, and means for intermittently rotating the block to present constantly new cutting surfaces as cutting operations proceed whereby the cutting surface is constantly changed throughout the cutting operations and continuously compacted to present an effective cutting surface.

12. In a machine of the character described, a cutter, and a cylindrical cutting block composed of disks of felted fiber material having a distinct grain, the disks being arranged with the grain portions of the edges of the disks pointing radially in different directions, the cylindrical block being rotatable so that fresh cutting surfaces on the cylindrical surface of the block may be provided for co-operation with the cutter.

13. In a machine of the character described, a cutter, a cylindrical cutting block composed of disks of felted fiber material, each disk having edge portions cut across the grain of the material, a shaft passing centrally through the disks to support the same with the grains of the disks pointing radially in different directions, and means for intermittently rotating the block to present constantly new cutting surfaces as cutting operations proceed whereby the cutting surface remains fresh throughout the cutting operations and the block itself constantly resurfaced.

14. In a machine of the character described, means for cutting sheet material comprising a cutter, and a cylindrical cutting block for co-operation with the cutter composed of felted fiber material, having distinct grains extending radially in different directions, to receive the thrust of the cutting edge of the cutter.

15. In a machine of the class described, a cutter, a cylindrical block, means for actuating the cutter toward and from the block, and gearing for rotating the block after each actuation of the cutter in such manner as to present successively a predetermined plurality of cutting surfaces to the cutter before an operation is repeated on the same cutting surface of the block.

In testimony whereof I have signed my name to this specification.

HARVEY L. GLIDDEN.